United States Patent [19]

Del Giorgio

[11] Patent Number: 5,027,521

[45] Date of Patent: Jul. 2, 1991

[54] SURVEYING APPARATUS

[76] Inventor: Martin Del Giorgio, 671 Awatovi Ovi, Flagstaff, Ariz. 86001

[21] Appl. No.: 353,877

[22] Filed: May 17, 1989

[51] Int. Cl.[5] .................. G01C 1/02; G01C 15/02
[52] U.S. Cl. ................................. 33/281; 33/293
[58] Field of Search .............. 33/227, 228, 280, 281, 33/286, 290, 293, 297

[56] References Cited

U.S. PATENT DOCUMENTS

| 1,105,930 | 8/1914 | Scott | 33/280 |
| 2,656,606 | 10/1953 | Porter | 33/281 |
| 2,990,618 | 7/1961 | Petree et al. | 33/280 |
| 3,505,739 | 4/1970 | Abrams | 33/227 |
| 4,343,550 | 8/1982 | Buckley et al. | 33/293 |
| 4,644,661 | 2/1987 | Bozzolato | 33/293 |

FOREIGN PATENT DOCUMENTS 1418738 10/1965 France .................. 33/280

Primary Examiner—Thomas B. Will
Attorney, Agent, or Firm—Tod R. Nissle

[57] ABSTRACT

A ground-based surveying system comprising components which can be utilized during the night time to determine ground contours and boundaries. The system utilizes a collimated beam of light to define the location of a reference point selected during a ground survey.

15 Claims, 5 Drawing Sheets

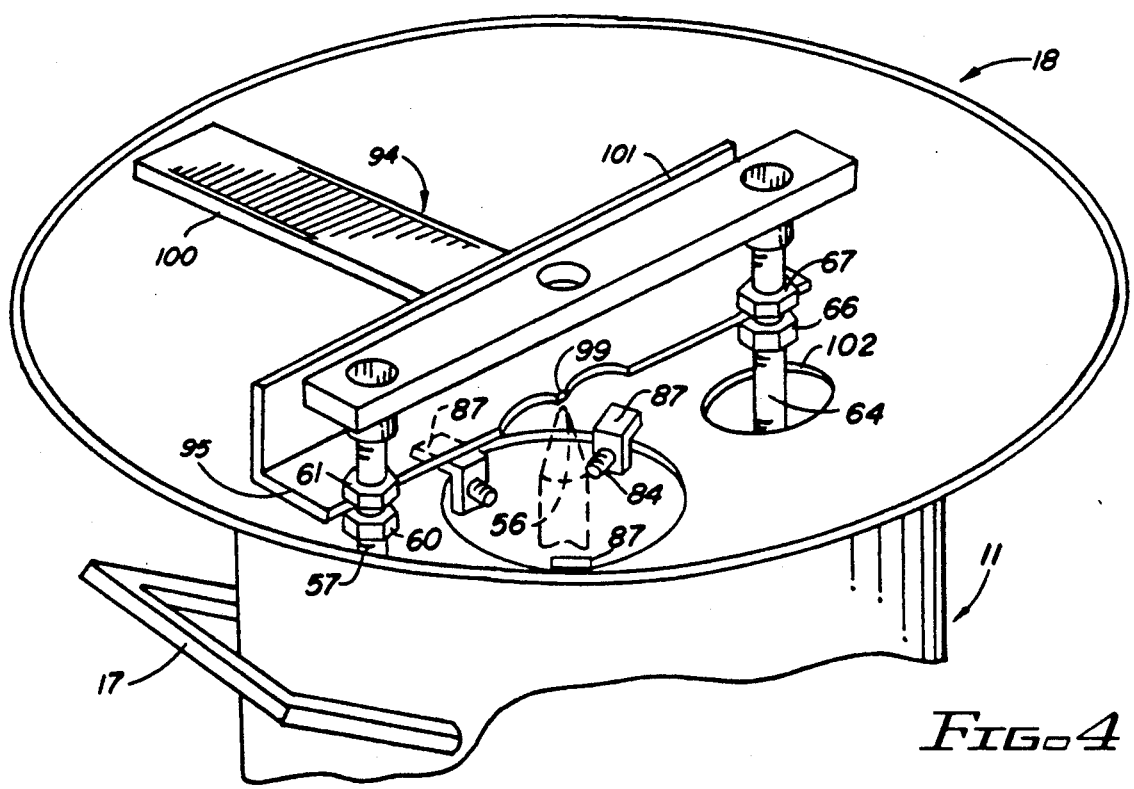

SURVEYING APPARATUS

This invention relates to an improved system for surveying

More particularly, the invention relates to a ground-based surveying system comprising components which can be utilized during the night time to determine ground contours and boundaries.

In another respect, the invention relates to a surveying system which utilizes a collimated beam of light to define the location of a reference point selected during a ground survey.

In still another respect, the invention relates to a surveying system which facilitates the determination of ground contours and boundaries when ground features block the line of sight from a surveyor to a reference point which must be defined during a ground survey.

Ground-based surveying techniques are well known in the art. See, for example, U.S. Pat. No. 4,343,550 to Buckley et al. Such prior art ground surveying systems are not readily employed at night, particularly in rough terrain.

Accordingly, it would be highly desirable to provide an improved ground surveying system which could be readily utilized during the night time to determine ground contours and boundaries, and which would be especially useful in the surveying of areas of land which experience substantial elevation differentials in short horizontal distances of travel.

Therefore, it a principal object of the invention to provide an improved ground surveying system.

Another object of the invention is to provide an improved ground surveying system which facilitates the determination of ground contours and boundaries in rough terrain during the night time.

A further object of the invention is to provide an improved ground surveying system of the type described which utilizes a collimated beam of light to identify a point to be defined during ground surveying.

These and other further and more specific objects and advantages of the invention will be apparent to those skilled in the art from the following detailed description thereof, taken in conjunction with the drawings, in which:

FIG. 4 is a top perspective view illustrating the collimating apparatus of FIG. 1 with an electrode positioning tool inserted thereon;

Figure 1:
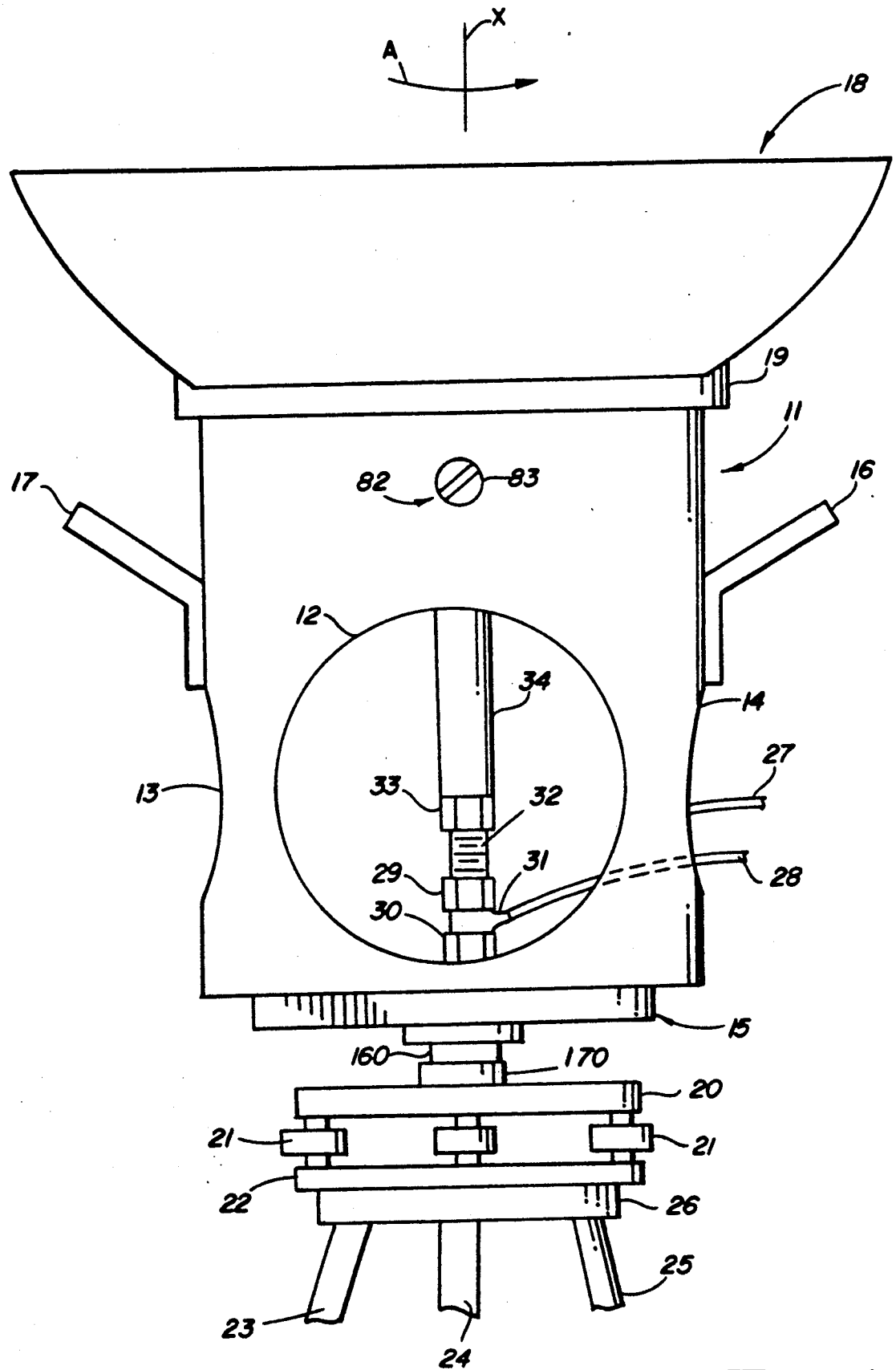
FIG. 1 illustrates target apparatus for producing a collimated beam of light in accordance with the presently preferred embodiment of the invention.

Briefly, in accordance with my invention, I provide improved apparatus for surveying during the night time to determine the location of a ground reference point. The apparatus includes a target normally positioned over said ground reference point and including a first frame, point source illumination means mounted on said frame for producing light rays emanating from at least one focal point, at least one reflector surface mounted on said frame and shaped and dimensioned to reflect at least a portion of said emanating light rays in parallel relationship to form a beam of light having a longitudinal axis, means for adjusting the orientation of said reflector surface such that the longitudinal axis of the light beam is parallel to a selected vertically oriented axis; and, means for viewing and determining the location of the vertically oriented beam of light with respect to a known reference point. The means for determining the location of the beam of light includes a second frame including a base; transit means mounted on the base and including a telescope, and an eye piece in the telescope. The transit means measures at least one of angles in a horizontal plane and angles in a vertical plane, said angles being between the known reference point and the ground reference point indicated by the vertically oriented light beam.

Turning now to the drawings, which depict the presently preferred embodiments and best mode of the invention for the purpose of illustrating the practise thereof and not by way of limitation of the scope of the invention and in which like reference characters represent corresponding elements throughout the several views, FIGS. 1 to 5 illustrate surveying apparatus constructed in accordance with the principles of the invention. The target of FIG. 1 has a frame including cylindrical hollow housing 11 attached to cylindrical base member 15. Circular openings or windows 12, 13, 14 are formed through cylindrical housing 11. Handles 16 and 17 are fixedly attached to housing 11. Parabolic reflector 18 is moveably seated on circular collar 19. Collar 19 is attached to the upper circular edge of cylindrical housing 11. Base 15 is pivotally attached to support member 20 such that base 15, housing 11, and reflector 18 can be rotated in the direction of arrow A about vertical axis X. Axis X passes through the focal point of reflector 18 and through the elongate center line of cylindrical housing 11. Support member 20 is connected to panel member 22 by a plurality of adjustable thumb screws 21. Thumb screws 21 are of a type commonly found on surveying transits and are used to level support member 20 and, consequently, to level base 15. If desired, at least one bubble level is attached to member 20 to indicate when member 20 is level. Panel member 26 is fixedly connected to member 22. Tripod legs 23, 24, 25 are pivotally attached at their upper ends to member 26 in a manner common to prior art transits. As is well known, means (not shown) can be provided for telescoping or otherwise adjusting the length of each of legs 23, 24, 25. Electrical leads 27, 28 are connected to a battery or other source of electricity (not shown). The end 31 of lead 28 inside housing 11 is secured between nuts 29, 30. Nuts 29, 30 turn about externally threaded member 32, as does nut 33 and internally threaded hollow cylindrical sleeve 34. Member 34 anchors housing 11 to base 15 and extends upwardly from base 15.

Figure 2:
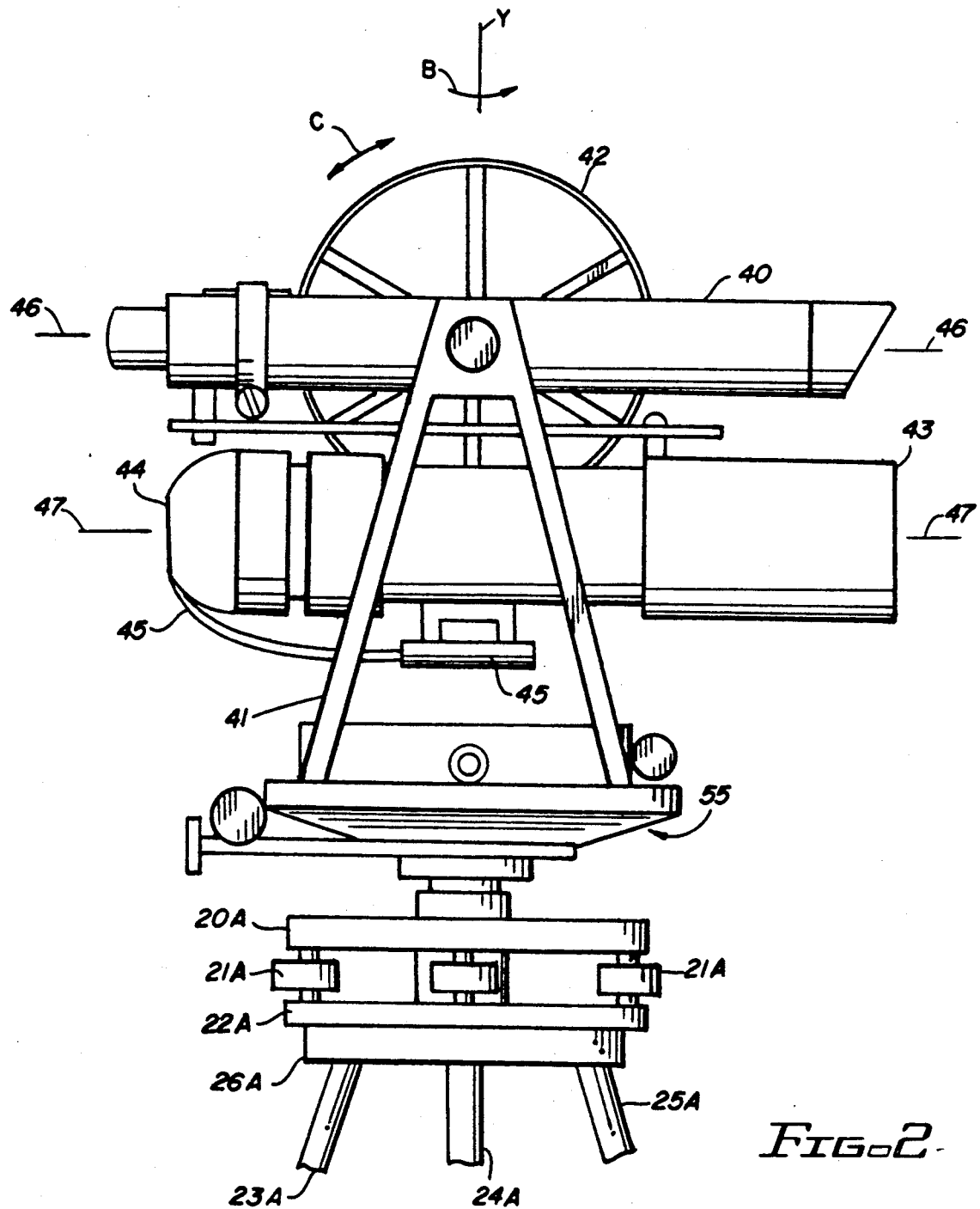
FIG. 2 illustrates transit apparatus for viewing and determining the location of a reference point identified by the collimated beam of light produced by the target apparatus of FIG. 1.
Figure 3:
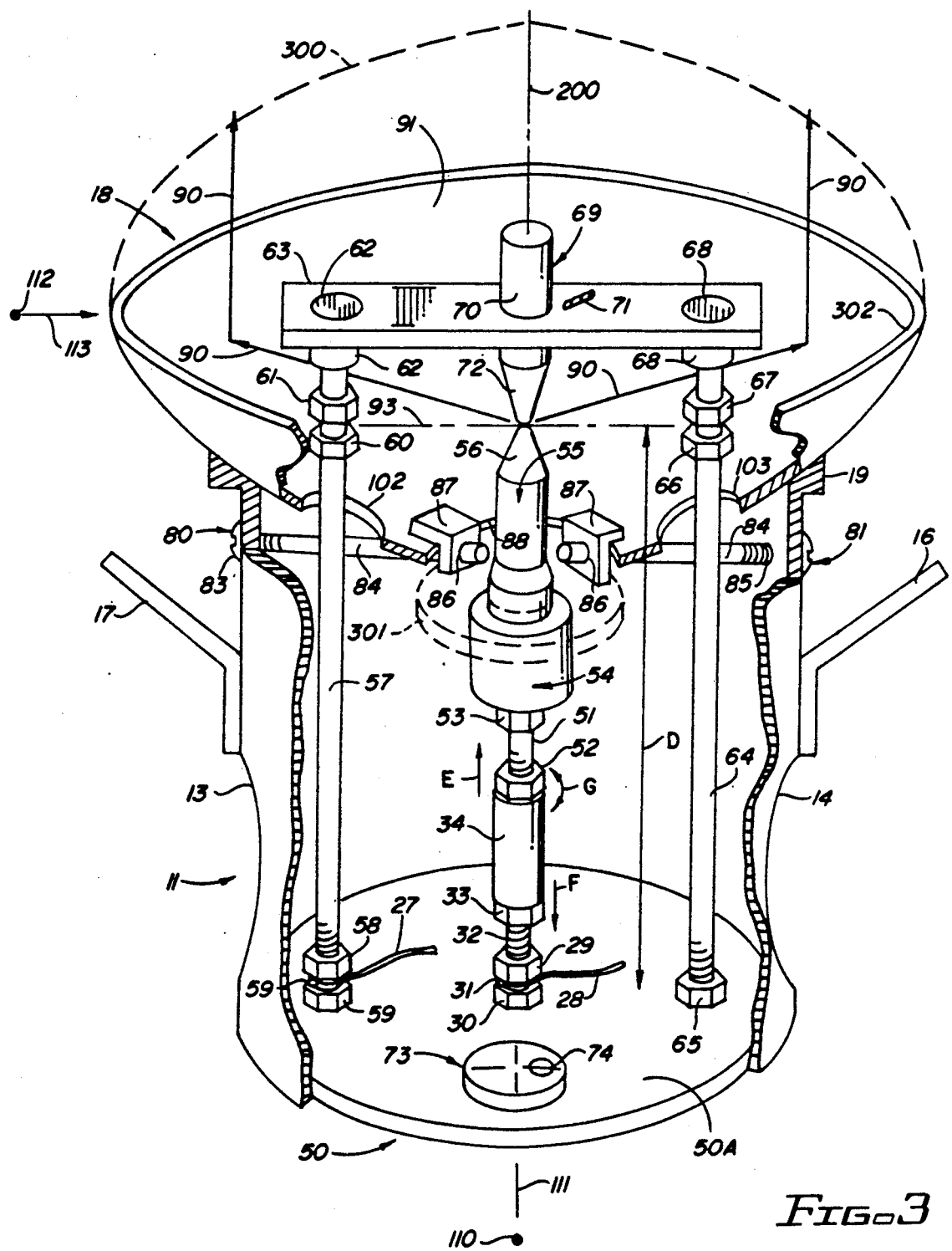
FIG. 3 is perspective view of the collimating apparatus of FIG. 1 with a portion thereof broken away to illustrate interior construction details thereof.

FIG. 2 illustrates target sighting apparatus for viewing and determining the location of a vertically oriented beam of light produced by the target of FIGS. 1, 3, 4. In FIG. 2, circular conical base 55 is rotatably attached to support member 20A such that base 55 can be rotated in the direction of arrow B about vertical axis Y. Support member 20A is attached to panel member 22A by a plurality of thumb screws 21A. Thumb screws 21A are turned to level member 20A and are of a type commonly found on surveying transits. Panel member 26A is connected to member 22A. If desired, at least one bubble level is attached to member 20A to indicate when member 20A is level. Tripod legs 23A, 24A, 25A are pivotally attached at their upper ends to member 26A in a manner common to prior art transits. As is well known, means (not shown) can be provided for telescoping or otherwise adjusting the length of each of legs 23A, 24A, 25A. Transit telescope 40 is pivotally mounted on frame member 41. Member 41 is fixedly connected to base 55. Telescope 40 is rotated about pivot point 148 in a generally vertical plane in the directions indicated by arrows C by manually turning spoked wheel 42. Telescope 43 is attached to telescope 40. The cross hairs in eyesight 44 of telescope 43 are illuminated by fiber optic system 45. Fiber optic system 45 is secured to telescope 43. Telescope 43 is preferably a sighting telescope for a rifle, and can be adjusted to enlarge a distant object one and one half to six times. The longitudinal axis 46 of telescope 40 is parallel to and generally lies in the same vertical plane as the longitudinal axis 47 of telescope 43. When wheel 42 is manually turned telescope 47 rotates simultaneously with telescope 46 about pivot point 148. The apparatus of FIG. 2 includes scales (not visible) for measuring vertical and horizontal angles in conjunction with telescopes 40, 43. These scales are of the type found on prior art theodolites or transits. If desired, the size of frame 41 can be increased such that the space intermediate telescope 43 and base 55 is increased so that telescopes 40 and 43 can be freely rotated 360° about pivot point 148.

In FIG. 3 the interior construction of the target of FIG. 1 is further illustrated and includes a panel shaped circular bottom 50. The lower end of threaded member 32 (not visible) extends through bottom 50 and anchors the target to base member 15. The upper end of member 32 passes through nut 33 and extends into internally threaded sleeve 34. The lower end of externally threaded member 51 passes through nut 52 and extends into internally threaded sleeve 34. The upper end of externally threaded member 51 extends through nut 53 and into an internally threaded aperture (not visible) formed in the bottom of chuck 54. Carbon electrode 55 is carried in chuck 54. The distance D of the tip 56 of carbon electrode 55 above bottom 50 can be adjusted by turning nut 33 to move nut 33 in the direction of arrow F along member 32 away from sleeve 34, by turning nut 52 to move nut 52 in the direction of arrow E along member 51 away from sleeve 34, and by turning sleeve 34 in the direction of arrows G to move sleeve 34 along member 32 to increase or decrease the distance of chuck 54 and tip 56 from bottom 50. After sleeve 34 has been rotated the desired amount, nut 33 is turned about externally threaded member 32 to move nut 33 along member 32 in the direction of arrow E and to tighten nut 33 against sleeve 34. The lower end of externally threaded member 57 extends through nuts 58 and 59 and through bottom 50 into base 15. Connector 59 is attached to one end of electrical lead 27. Connector 59 is secured between nuts 58 and 59. The upper end of member 57 extends through spaced apart internally threaded nuts 60 and 61 and into internally threaded cap 62. Cap 62 is fixedly secured in an aperture formed in rectangular elongate bar 63. The lower end of externally threaded member 64 extends through internally threaded nut 65 and bottom 50 into base 15. The upper end of member 64 extends through spaced apart internally threaded nuts 66 and 67 and extends into internally threaded cap 68. Cap 68 is fixedly secured in an aperture formed in bar 33. Carbon electrode 69 is slidably received by aperture 70 formed through bar 63. Set screw 71 is used to secure electrode 69 in aperture 70. The tip 72 of electrode 69 is illustrated touching tip 56 of electrode 55 in FIG. 3. During operation of the target of FIG. 3 tips 56 and 72 are spaced apart so an arc is formed therebetween. Base 15 and bottom 50 are preferably constructed of an insulating material which does not readily conduct electricity. Bubble level 73 is mounted to bottom 50. Bubble 74 of level 73 is illustrated in FIG. 3 as being off center, indicating that bottom 50 is not level.

Reflector 18 is not connected to but instead slidably rests on collar 19 of the target illustrated in FIGS. 1, 3, 4. This permits the orientation of reflector 18 to be adjusted with screws 80, 81 and 82. The elongate threaded portion 84 of each screw 80 to 82 passes through an aperture 85 formed through housing 11 and also passes through an aperture 86 in an L-shaped bracket 87. Each L-shaped bracket is mounted on the edge of a circular aperture 88 formed through reflector 18. The head 83 of each screw 80 to 82 is positioned on the exterior of housing 11. Consequently, screws 80 to 82 can be utilized to slide reflector 18 over collar 19 and to position reflector 18 in any of a wide variety of orientations with respect to housing 11. As would be appreciated by those with skill in the art, the primary function of screws 80 to 82 is to enable reflector 18 to be adjusted such that lights rays 90 which emanate from the focal point of parabolic reflector surface 91 and are reflected off of surface 91 are, after being reflected from surface 91, traveling in a direction which is generally perpendicular to the upper circular planar surface 50A of bottom 50.

Electrical leads 27, 28 are presently preferably connected to batteries which provide 36 volts and 75 amps of current through electrodes 55 and 69. Approximately 2400 watts of power are produced. The electricity follows a path extending along lead 27, member 57, bar 63, electrode 69, electrode 55, chuck 54, member 51, sleeve 34, member 32, and lead 28. When electricity is traveling along this path tips 56, 72 are spaced apart such that an arc is formed intermediate tips 56, 72. The arc produces light rays 90 which emanate toward and reflect off of parabolic reflector surface 91. In order for the target of FIGS. 1 and 3 to produce a collimated beam of light rays 90, the arc extending between tips 56, 72 is positioned at the focal point of parabolic surface 91. This is accomplished by positioning tip 56 at the focal point of surface 91. In FIG. 3 the focal point of surface 91 is located along dashed line 93. The focal point is the point at which vertical axis 200 intersects line 93. Line 93 intersects two points. The first point is midway between nuts 66 and 67. Nut pairs 60, 61 and 66, 67 are positioned on members 57 and 64, respectively, such that line 93 is a distance D above bottom 50 and the focal point of surface 91 lies on line 93. In order to position tip 56 along dashed line 93, tool 94 is utilized in the manner depicted in FIG. 4.

In FIG. 4 elongate foot panel 95 is, in part, slid intermediate nut pair 60, 61 and nut pair 66, 67. Semicircular notches 96, 97 (not visible in FIG. 4; see FIG. 5) partially encircle externally threaded members 57, 64, respectively. Nut pairs 60, 61 and 66, 67 are positioned along members 57 and 64, respectively, such that when tool 94 is positioned in the manner illustrated in FIG. 4, all points along edge 98 are equidistant from surface 50A. Each point along edge 98 is a distance above surface 50 which is indicated by arrows D in FIG. 3. In FIG. 4 point 99 indicates the desired position of tip 56 of electrode 55. Consequently, after tool 94 is inserted intermediate nut pairs 60, 61 and 66, 67 in the manner shown in FIG. 4, the height of electrode 55 above bottom 50 is adjusted until tip 56 is immediately adjacent point 99. The vertical position or height of tip 56 is adjusted by first turning nut 33 along member 32 in the direction of arrow F away from sleeve 34 and turning nut 52 along member 51 in the direction of arrow E away from sleeve 34. Sleeve 34 is then rotated to move sleeve 34 along member 32 toward or away from bottom 50. After sleeve 34 is rotated to its desired position along member 32, nut 33 is rotated along member 32 in the direction of arrow E and is tightened against sleeve 34. Elongate members 57 and 64 extend through circular openings 102 and 103, respectively, formed in reflector 18.

Figure 5:
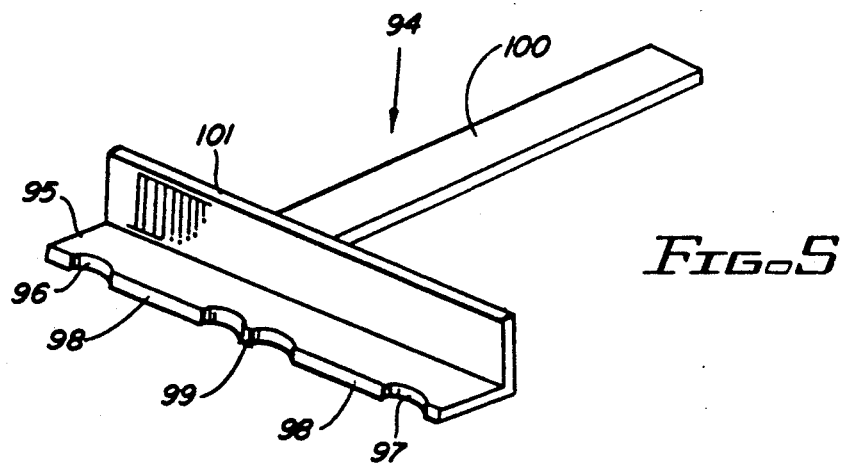
FIG. 5 is a perspective view illustrating the electrode positioning tool of FIG. 4.

As shown in FIGS. 4 and 5, tool 94 includes handle 100 connected to upright panel 101. Panel 101 is perpendicular to and attached to elongate foot panel 95.

In use, the position of reflector 18 is calibrated by setting up the target of FIG. 1 directly adjacent and in front of a known vertical reference line. In FIG. 1, axis X can represent the known vertical reference line. Thumb screws 21 are adjusted to level base 15. When base 15 is level the longitudinal axes of members 57, 64, of sleeve 34, of members 32 and 51, and of chuck 54 are vertical and parallel, both to one another and to the vertical elongate center line of cylindrical housing 11. Electricity is passed through leads 27 and 28 to ignite an arc between tips 72 and 56 to produce a vertically oriented beam of light comprised of parallel rays 90 traveling away from reflector surface 91. If the center line of the collimated beam of light is parallel to the known vertical reference line then parabolic reflector 18 is properly oriented on cylindrical member 11. If, however, the longitudinal center line of the collimated beam of light is skewed with respect to the known vertical reference line then screws 80 to 82 are turned to adjust the orientation of reflector 18 until the longitudinal center line of the collimated beam of light is parallel to the known vertical reference line. The position of the longitudinal center line of the collimated beam with respect to the known vertical reference line is preferably determined from at least two separate ground observation points. For example, a first observation point 110 would permit the collimated beam of light (and the known vertical reference line) to be viewed from in front of the target illustrated in FIG. 3. Arrow 111 indicates the line of sight from observation point 110. A second observation point 112 permits the collimated beam produced by the target to be viewed from one side of the target of FIG. 3. Arrow 113 indicates the line of sight from observation point 112 The position of the collimated beam with respect to the known reference line must ordinarily be viewed from at least two observation points in order to accurately determine if the longitudinal center line of the collimated beam is truly parallel to the known vertical reference line.

After the orientation of reflector 18 has been calibrated in the manner described in the foregoing paragraph, the target of FIG. 1 is positioned above and corresponds to a selected reference point 150 on ground being surveyed with the apparatus of the invention. Thumb screws 21 are adjusted to level member 20 and base 15. See FIG. 6. The target sighting apparatus of FIG. 2 is positioned at a known reference point on ground 120 being surveyed. Thumb screws 21A are adjusted to level member 20A and base 55. Telescope 43 is pointed in the direction of the target. Tool 94 is used in the manner earlier described to position tip 56 at the focal point of reflector surface 91 and at a distance above base 50 indicated by arrows D in FIG. 3. Set screw 71 is loosened and carbon electrode 69 is slidably adjusted in aperture 70 such that tips 56 and 72 are slightly spaced apart. Set screw 71 is tightened to secure electrode 69 in aperture 70. Electricity is directed through leads 27 and 28 to produce an arc extending across the space between tips 56 and 72. Light rays 90 emanating from the arc are reflected from surface 91 to form a collimated beam 130 of light comprised of parallel rays 90. As beam 130 travels away from reflector 18 it diverges according to well known laws of physics. Beam 130 has a vertical longitudinal centerline 131. Beam 130 is sighted through telescope 43 and is centered on the vertical cross hair in the eye piece of telescope 43. Importantly, a conventional transit telescope 40 ordinarily cannot be utilized to sight beam 130 because the high magnification of telescope 40 will not capture sufficient light for beam 130 to be accurately sighted.

Figure 6:
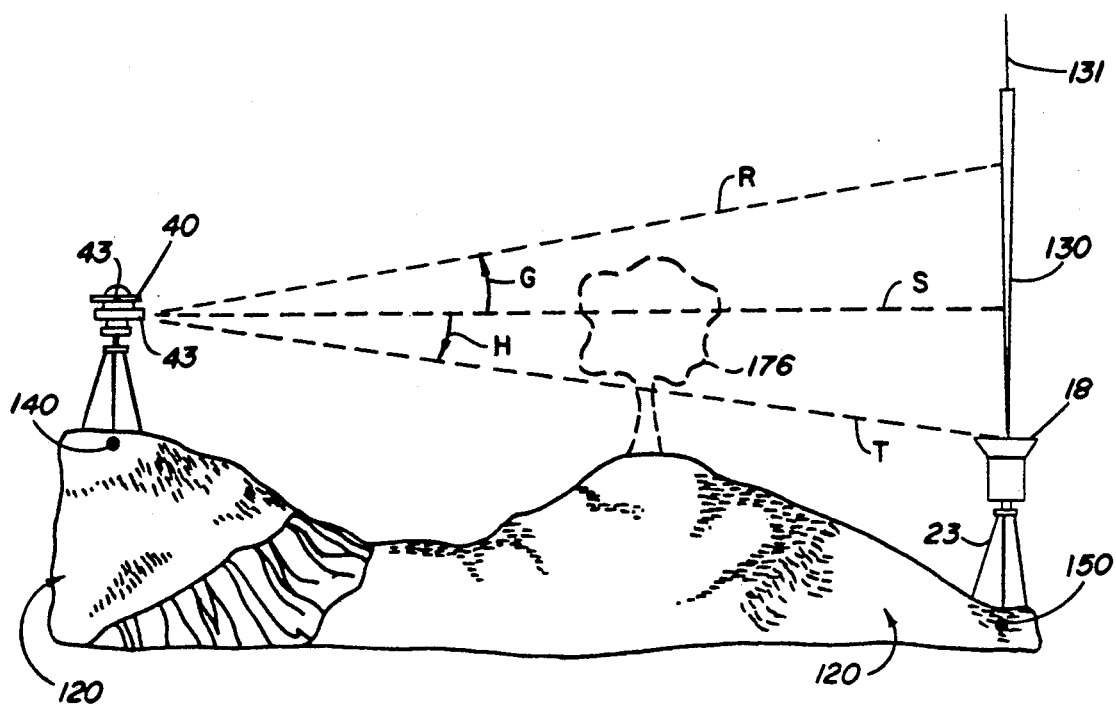
FIG. 6 is a elevation view illustrating the mode of operation of the apparatus of the invention; and, FIG. 7 is a schematic view illustrating the use of the apparatus of the invention to identify the position of a reference point with triangulation surveying techniques.
Figure 7:
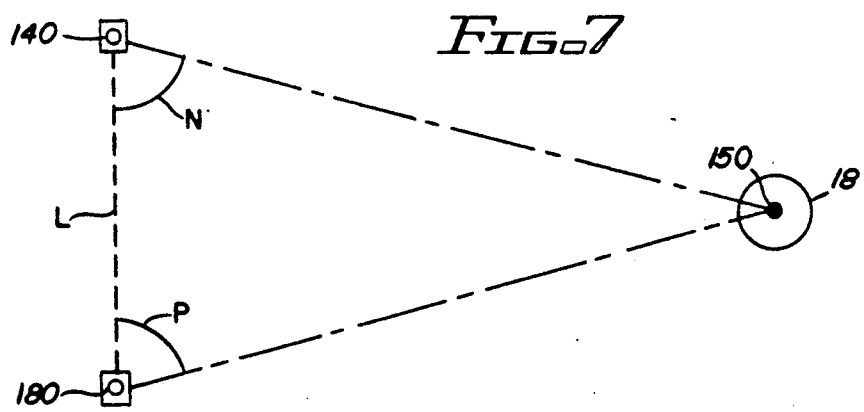

In FIG. 6, the target sighting apparatus is position above known reference point 140 and the target is position above selected reference point 150. Simply sighting beam 130 through telescope 43 determines the location of reference point 150 with respect to known reference point 140. Such a sighting is a line-of-sight determination. Base line triangulation techniques, illustrated in FIG. 7 are well known in the art and may also be employed to determine the location of reference point 150 with respect to reference point 120. In base line triangulation the target sighting apparatus of FIG. 2 is sequentially positioned at two known reference points 140, 180 located a known distance apart along an established base line L. With the base line distance known and the line of sight angular dispositions N and P determined utilizing the target sighting apparatus of FIG. 2, trigonometry is utilized to locate the position of collimated beam 130 and, accordingly, of reference point 150. Reference point 150 is directly beneath beam 130 in FIG. 6. Known reference point 140 is directly beneath pivot point 43 in FIG. 6. The positioning or centering of the target over point 150 and of the target sighting apparatus directly over point 140 and/or 180 is accomplished by using well known techniques. For example, a plumb bob and line can be used.

A portable battery case is preferably utilized in conjunction with the target of FIG. 1. The portable case includes three rechargeable twelve volt batteries. A switching mechanism in the case connects the batteries in series when electricity is being supplied through leads 27 and 28 connected to the battery case and connects the batteries in parallel when the batteries are being recharged.

In FIG. 1 the lower end of neck 160 (not visible) is received by collar 170. Ball bearings (not visible) in collar 170 permit the lower end of neck 160 to rotate in collar 170. Neck 160 is fixedly connected to base 15. In utilizing the apparatus of the invention in the manner illustrated in FIG. 6, two sightings of collimated beam 130 are preferably taken to minimize error. After the target is set up and leveled such that bubble level 73 is oriented with bubble 74 centered in the cross hairs of the bubble level, telescope 43 is utilized to take a first sighting of collimated beam 130. The reflector 18 and housing 11 are then rotated 180° by grasping handles 16 and 17 and turning housing 11, base 15 and throat 160. Telescope 43 is used to take a second sighting. Before the second sighting is taken bubble level 73 is checked to ensure that bubble 74 is centered on the cross hairs of level 73. If bubble 74 is not centered, thumb screws 21 are adjusted as necessary to center bubble 74. If desired, a plurality of bubble levels or other leveling indicators can be mounted on bottom 50, housing 11, etc. The results of the first and second sightings are averaged to reduce error.

The carbon electrodes 55 and 69 utilized in the presently preferred embodiment of the invention are relatively inexpensive and simple in use. Any other prior art means may be utilized to produce emanating light rays at the focal point of parabolic reflector surface 91. For example, a xenon short arc lamp can be utilized, as can a mercury xenon short arc lamp. The xenon short arc lamps contain several atmospheres of xenon gas and produce a light spectrum which is continuous in the visible with strong lines in the near infrared (800–1000 nanometers). Xenon and mercury short arc lamps are sold by Optical Radiation Corporation of 1300 Optical Drive, Azusa, Calif. 91702. Any reflector surface or combination of reflector surfaces can be utilized which reflects light from one or more sources to produce a collimated beam of light.

When carbon electrodes 55 and 69 are utilized, they typically need only produce light for approximately 15 to 20 seconds to permit the target sighting apparatus of FIG. 2 to sight and determine the location of collimated beam 130. The three twelve volt batteries presently utilized in the practise of the invention have the capacity to power electrodes 55 and 69 for approximately two minutes before the batteries have to be recharged. The batteries therefore permit at least six sightings to be made of collimated beam 130 during the night time utilization of the target and the target sighting apparatus of FIGS. 1–4.

The particular advantages of the invention are its portability, its accuracy, its ready utilization of existing surveying transits and surveying tripod bases, and the ability to assemble the invention from relatively inexpensive components. Most importantly, the apparatus of the invention gives a surveying team the ability to identify selected reference points during the night time in rough terrain. When, as illustrated in FIG. 6, an existing ground feature 176 interdicts the direct horizontal line of sight S between telescope 43 and beam 130, telescope 43 is turned about pivot point 143 to sight beam 130 along slant range R. Since the target sighting apparatus of FIG. 2 preferably has means for measuring angles in a vertical plane the angle G is readily determined. Similarly, the angle H is readily determined when a downwardly sloping slant range T is utilized to sight target 18. When telescope 43 is used to sight the point at which beam initially departs reflector 18 and when the elevation (in FIG. 6) of reference point 140 is known, angles G and/or H can be utilized to determine the elevation of reference point 150 (assuming that the distance of reflector 18 above the ground and of telescope 43 above the ground are known). Determining position angles G and/or H comprises a determination of the position of reference point 150 with respect to reference point 140.

In FIGS. 1 and 3, heads 83 can be nut-shaped so that a monkey wrench can be utilized to turn threaded portions 84. A cover, indicated by dashed lines 300 in FIG. 3, can be provided for reflector 18. Negative electrode 55 can be carbon, tungsten or any other suitable material. When electrode 55 is positioned, tip 56 can be located slightly below (typically one-eighth to one quarter inch below) the focal point of surface 91. During operation of the target of FIG. 1, material from positive electrode 69 is deposited on tip 56. This deposited material gradually builds up on tip 56 to a height equivalent to the focal point of surface 91. As the deposited material builds up on tip 56 to the focal point of surface 91, the beam reflected from surface 91, which is initially fan shaped, becomes more collimated. When the tip 56 is slightly below the focal point of surface 91, and the target of FIGS. 1 and 3 is operated, the beam will initially be fan shaped. After the target of FIG. 1 has been operated a sufficient period of time, presently about eight to ten seconds, the material deposited on tip 56 builds up to the focal point of reflector 91 and the beam becomes cylindrical and collimated.

A washer, indicated by ghost outline 301 in FIG. 3, can be positioned on clutch 54 to catch sparks or ignited material deflected downwardly from tip 56 toward bottom 50 during operation of the target of FIG. 1. The diameter of the washer can be increased from that depicted in FIG. 3 so that washer 301 functions as a horizontally oriented pan which extends partially or completely from chuck 54 to housing 11.

The bubble lever 73 can be replaced or augmented by a bubble level which is adjustable to an accuracy of five to thirty seconds. Such additional levels can be mounted on bottom 50, housing 11, etc. and are well known to those of skill in the art. An aperture can be cut in bottom 50 or other means can be provided so that chuck 54, member 51, member 32 and nuts 53, 52, 29, 30 can be laterally or horizontally moved with respect to bottom 50. Such lateral movement of chuck 54 will permit the lateral adjustment of negative electrode 55. Similar means can be provided for laterally adjusting members 57, 64.

One type of highly accurate bubble level includes a horizontally disposed elongate vial. One end of the elongate vial includes a ball which rotates in a fixed socket joint. The other end of the elongate vial is vertically adjustable, typically by a vertically oriented screw which threads through the other end of the elongate vial.

In the presently preferred embodiment of the invention the diameter of lip 302 is approximately 14". When the target of FIG. 1 is a mile away from the target sighting apparatus of FIG. 2, a three power telescope 43 is typically presently utilized. When the target is two miles away, a four to five power telescope is utilized. When the target is three miles away, a six to eight power telescope 43 is presently typically utilized. When the target is ten miles away, it is anticipated that a ten to twelve power telescope 43 would be utilized.

A set screw (not shown) in collar 170 (FIG. 1) is used to secure neck 160 in a desired position.

Having described my invention in such terms as to enable those skilled in the art to understand and practise it, and having identified the presently preferred embodiments thereof, I claim:

1. Apparatus for surveying during the night time to determine the location of a ground reference point, including (a) a target normally positioned over said ground reference point and including
  (i) a first frame,
  (ii) point source illumination means mounted on said frame for producing light rays visible to the human eye at night and emanating from at least one focal point,
  (iii) at least one reflector surface slidably mounted on said frame, movable independently of said point source illumination means, and shaped and dimensioned to reflect at least a portion of said emanating light rays in parallel relationship to form a beam of light having a longitudinal axis, and
  (iv) means for slidably adjusting over said frame independently of said point source illumination means the orientation of said reflector surface such that the longitudinal axis of said light beam is parallel to a selected vertically oriented axis; and,
(b) means for viewing and determining the position of said vertically oriented beam of light with respect to a known reference point, said viewing means located at said known reference point and including
  (i) a second frame including a base,
  (ii) transit means mounted on said base and including
    a telescope, and
    an eye piece in said telescope,
  said transit means measuring at least one of
    angles in a horizontal plane, and
    angles in a vertical plane,
  said angles being between said known reference point and said ground reference point indicated by said vertically oriented light beam.

2. The apparatus of claim 1 wherein said telescope produces an image of said beam which is magnified by a factor in the range consisting of 1.5 times to 6.0 times the normal image of said beam produced by the unaided human eye.

3. The apparatus of claim 1 wherein said point source illumination means includes a pair of electrodes each having a tip spaced apart from the tip of the other electrode, said tips being spaced apart and positioned with respect to said reflector surface such that
  (a) the passage of electricity through said electrodes forms an arc intermediate said tips to produce said light rays and causes material from one electrode to deposit on said tip of the other electrode; and,
  (b) the deposit of material from one electrode onto the other electrode while said reflector surface remains in a fixed position with respect to the electrodes causes the collimation of said beam of light to increase for a selected period of time after said arc is initially formed.

4. Apparatus for surveying during the night time to determine the location of a ground reference point, including
(a) a target normally positioned over said ground reference point and including
  (i) a first frame,
  (ii) point source illumination means mounted on said frame for producing light rays emanating from at least one focal point,
  (iii) at least one reflector surface slidably mounted on said frame and shaped and dimensioned to reflect at least a portion of said emanating light rays upwardly away from said ground reference point in parallel relationship to form a beam of light having a longitudinal axis, said point source illumination means including a pair of electrodes each having a tip spaced apart from the tip of the other electrode, said tips being spaced apart and positioned with respect to said reflector surface such that
    the passage of electricity through the electrodes forms an arc intermediate said tips to produce said light rays, and causes material from one electrode to deposit on said tip of the other electrode, and
    the deposit of material from one electrode onto the other electrode while said reflector surface remains in fixed position with respect to the electrodes causes the collimation of said beam of light to increase for a selected period of time after said arc is initially formed, and
  (iv) means for adjusting the orientation of said reflector surface such that the longitudinal axis of said light beam is parallel to a selected vertically oriented axis; and,
(b) means for viewing and determining the position of said vertically oriented beam of light with respect to a known reference point, said viewing means located at said known reference point and including
  (i) a second frame including a base,
  (ii) transit means mounted on said base and including
    a telescope, and
    an eye piece in said telescope,
  said transit means measuring at least one of
    angles in a horizontal plane, and
    angles in a vertical plane,
  said angles being between said known reference point and said ground reference point indicated by said vertically oriented light beam.

5. The apparatus of claim 4 wherein
(a) said reflector surface is slidably mounted on said frame and movable independently of said point source illumination means; and,
(b) said means for adjusting the orientation of said reflector surface slidably moves said reflector surface over said frame.

6. The apparatus of claim 5 including
support means attached to said frame for maintaining said point source illumination means in a selected position with respect to said frame, said support means being shaped and dimensioned to removably receive positioning means, said
positioning means including
  (a) a first connector portion shaped and dimensioned to engage said support means in a selected orientation with respect to said support means, and
  (b) a second positioning portion connected to said first portion and indicating the position of said tip of one of said electrodes when said first position is in said selected orientation.

7. The apparatus of claim 4 including
support means attached to said frame for maintaining said point source illumination means in a selected position with respect to said frame, said support means being shaped and dimensioned to removably receive positioning means, said
positioning means including (a) a first connector portion shaped and dimensioned to engage said support means in a selected orientation with respect to said support means, and (b) a second positioning portion connected to said first portion and indicating the position of said tip of one of said electrodes when said first position is in said selected orientation.

8. The apparatus of claim 4 wherein said telescope produces an image of said beam which is magnified by a factor in the range consisting of 1.5 time to 6.0 times the normal image of said beam produced by the unaided human eye.

9. The apparatus of claim 6 wherein said telescope produces an image of said beam which is magnified by a factor in the range consisting of 1.5 time to 6.0 time the normal image of said beam produced by he unaided human eye.

10. Apparatus for surveying during the night time to determine the location of a ground reference point, including (a) a target normally positioned over said ground reference point and including
  (i) a first frame,
  (ii) point source illumination means mounted on said frame for producing light rays emanating from at least one focal point,
  (iii) at least one reflector surface slidably mounted on said frame and shaped and dimensioned to reflect at least a portion of said emanating light rays in parallel relationship to form a beam of light having a longitudinal axis,
  (iv) means for adjusting the orientation of said reflector surface such that the longitudinal axis of said light beam is parallel to a selected vertically oriented axis,
  (v) support means attached to said frame for maintaining said point source illumination means in a selected position with respect to said frame, said support means being shaped and dimensioned to removably receive positioning means, said positioning means including
    a first connector portion shaped and dimensioned to engage said support means in a selected orientation with respect to said support means, and
    a second positioning portion connected to said first portion and indicating the desired position of said point source illumination means when said first portion of said positioning means is in said selected orientation; and, (b) means for viewing and determining the position of said vertically oriented beam of light with respect to a known reference point, said viewing means located at said known reference point and including
  (i) a second frame including a base,
  (ii) transit means mounted on said base and including
    a telescope, and
    an eye piece in said telescope,
    said transit means measuring at least one of
      angles in a horizontal plane, and
      angles in a vertical plane,
    said angles being between said known reference point and said ground reference point indicated by said vertically oriented light beam.

11. The apparatus of claim 10 wherein (a) said reflector surface is slidably mounted on said frame and movable independently of said point source illumination means; and, (b) said means for adjusting the orientation of said reflector surface slidably moves said reflector surface over said frame.

12. The apparatus of claim 11 wherein said point source illumination means includes a pair of electrodes each having a tip spaced apart and positioned with respect to said reflector surface such that (a) the passage of electricity through the electrodes forms an arc intermediate said tips to produce said light rays and causes material from one electrode to deposit on said tip of the other electrode; and, (b) the deposit of material from one electrode onto the other electrode while said reflector surface remains in fixed position with respect to the electrodes causes the collimation of said beam of light to increase for a selected period of time after said arc is initially formed.

13. The apparatus of claim 10 wherein said point source illumination means includes a pair of electrodes each having a tip spaced apart from the tip of the other electrode, said tips being spaced apart and positioned with respect to said reflector surface such that (a) the passage of electricity through the electrodes forms an arc intermediate said tips to produce said light rays and causes material from one electrode to deposit on said tip of the other electrode; and, (b) the deposit of material from one electrode onto the other electrode while said reflector surface remains in fixed position with respect to the electrodes causes the collimation of said beam of light to increase for a selected period of time after said arc is initially formed.

14. The apparatus of claim 12 wherein said telescope produces an image of said beam which is magnified by a factor in the range consisting of 1.5 times to 6.0 times the normal image of said beam produced by the unaided human eye.

15. The apparatus of claim 13 wherein the telescope produces an image of said beam which is magnified by a factor in the range consisting of 1.5 times to 6.0 times the normal image of said beam produced by the unaided human eye.

* * * * *